Patented Jan. 17, 1933

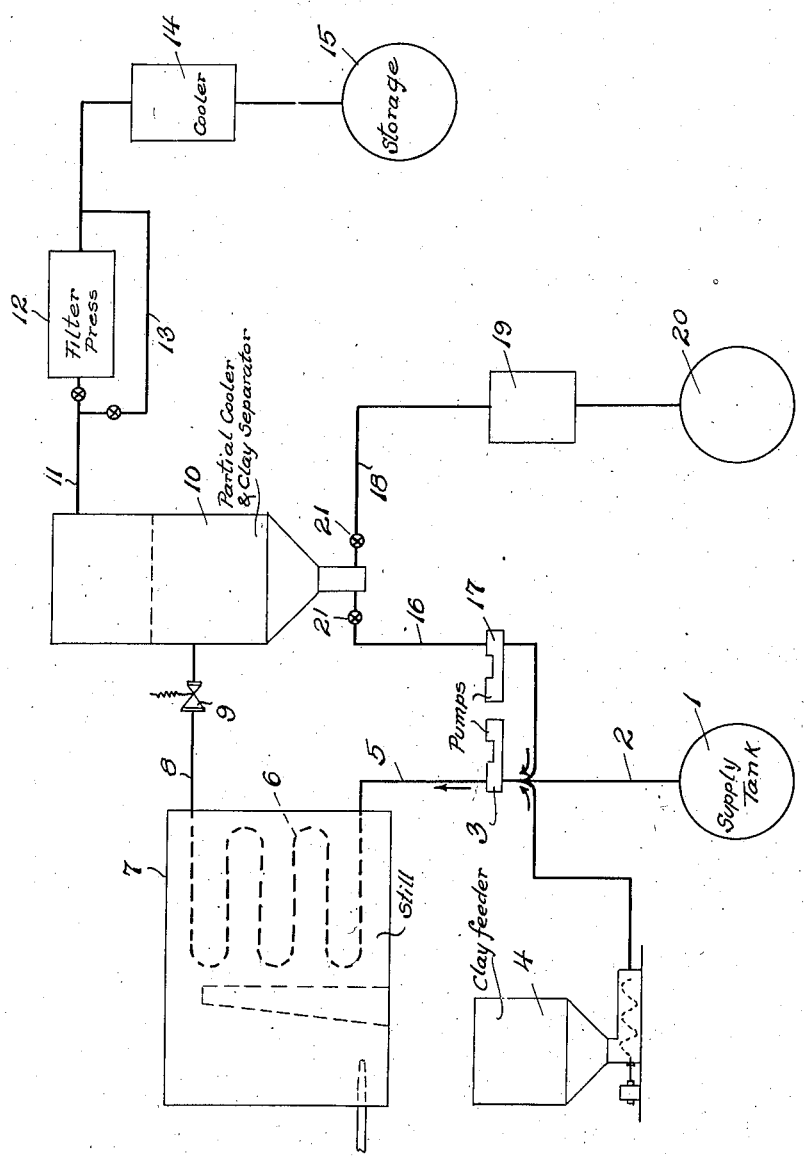

1,894,323

UNITED STATES PATENT OFFICE

RUDOLPH C. OSTERSTROM, OF CHICAGO, ILLINOIS, ASSIGNOR TO THE PURE OIL COMPANY, OF CHICAGO, ILLINOIS, A CORPORATION OF OHIO

METHOD OF PURIFYING OILS

Application filed February 15, 1930. Serial No. 428,796.

This invention relates to the treatment of petroleum oils intended for use as lubricants for the purpose of removing from such oils objectionable compounds which under certain circumstances discolor the oil or the finished lubricating stock or which tend to increase the acid content thereof and which possess other undesirable attributes necessitating their removal before a marketable lubricating oil is secured.

In decolorizing, deacidifying and purifying lubricating oils it has been proposed heretofore to pass such oils while commingled with a treating agent, such as fuller's earth, through an elongated treating zone wherein the oils are heated to temperatures above the vaporization point but are maintained in the liquid phase by the employment of super-atmospheric pressures, and wherein provision is made for cooling the oils, continuously reducing the pressure thereon and removing the solid treating agent therefrom prior to the time the finished and treated product is stored. In such systems of operation the treating agent or adsorbent consists principally of fuller's earth and/or its equivalent, the latter being continuously introduced into the lubricating oils to be purified while the latter are constantly moving as a flow stream through the heated treating zone. At the end of the operation it has been customary to pass the treated oils together with the solid adsorbent under pressure through a separating device such as a filter press in order to remove from the oils the solid treating agent and the impurities adsorbed thereby. By this previous method of operation the costs of maintaining the system in effective operation are high for the reason that the treating material, e. g. fuller's earth, passes but once through the system and before it can be reused it is necessary to subject the earth to heat treatment in order to remove therefrom adsorbed oils and other impurities and, furthermore, the rate of earth loss is high so that in many operations it is customary to employ nothing but fresh fuller's earth rather than to employ or reuse burned earth which possesses less effective treating properties and tends to render the system correspondingly less efficient in operation.

The present invention provides, in a lubricating oil purifying system of the character specified, for the separation of the fuller's earth from the treated oils following passage of the commingled earth and oils in the liquid phase through the heated treating zone, and wherein provision is made for the return of the earth to the inlet side of said heating zone in order that the earth may with full effectiveness and efficiency be reused as a treating agent in said heating zone. I have discovered that fuller's earth used in such systems, before being forced under pressure through a filter press, still possesses its purifying properties to a very large degree and can be economically and advantageously used, without additional treatment, in the treating zone of the system. If the clay is advanced through a filter press operation the pressures employed tend, it is believed, to force the adsorbed matter on the surface of the clay into the small microscopic pores of the clay particles, with the result that when the clay is removed from the filter press in the form of cakes, extremely vigorous treatment is required to effect the removal of the oil-impurities from the clay and these reviving operations are conducted at high costs and the clay obtained therefrom is not a completely satisfactory treating agent. Therefore, the present invention resides in diverting a portion, at least, of the clay mixture from the bottom of a settling tank, before passage through the filter press, in order that the diverted clay mixture may be returned to the inlet side of the treating zone for reuse as a purifying agent in said zone. This reuse of the treating agent, without removal thereof from the system results in marked economies in the matter of clay consumption and at the same time maintaining the full effectiveness of the purifying treatment.

The objects of my invention and one manner of giving it practical application may be best appreciated from the following description of an illustrative embodiment thereof, taken in connection with the appended claims and the accompanying drawing in which the figure is a diagrammatic elevational view, partly in vertical cross-section showing one general arrangement of apparatus suitable for use in the practice of my invention.

Referring more particularly to the drawing, the numeral 1 designates a supply tank containing a body of lubricating oil which is to be fed to the system for purification purposes. Leading from the tank 1 is an outlet line 2, which extends to a charging pump 3. Communicating with the inlet side of the pump 3 is a clay feeding unit 4 by which fuller's earth or its equivalent may be introduced into the liquid oil entering the pump 3 and thoroughly commingled with such oil.

From the pump 3 the commingled oil and fuller's earth are passed as a confined flow stream through a pipe line 5 which leads to a tank of tubes 6 arranged in a furnace setting 7, the said tubes constituting an elongated heating zone of restricted cross-sectional area. Within this heating zone the oils are heated to a temperature above their normal vaporizing points but are maintained in the liquid phase by the employment of super-atmospheric pressures thereon. While in the heating zone the oils are brought into intimate contact with the heated fuller's earth which at temperatures in excess of 500° F. possess a high degree of activity by which impurities present in the oils are apparently adsorbed by the fuller's earth.

The oils discharged from the tubes 6 pass through a pipe line 8 provided with a pressure reduction valve 9 to a primary cooler and clay separator 10. This element consists of a casing having the exterior walls thereof provided with an insulated covering designed to minimize heat losses through radiation on the part of the oils contained within the casing. Usually the oils within the cooler or separator 10 possess a temperature of approximately 350° to 450° F. so that their viscosity is sufficiently high to permit the clay-treating material to settle to the bottom of the separator, leaving the clay-free oils at the top of the separator. These clay-free oils may be drawn off through a pipe line 11, and pass through a filter press 12 in order to remove all entrained solids therefrom. If desired, however, the line 11 may be provided with a valve controlled by pass 13 by which the purified oils leaving the separator 10 may be passed around the filter press 12 if the operation of the latter is not needed. The line 11 on the outlet side of the filter press passes through a final cooler 14 which operates to effect the necessary reduction in the temperature of the purified oils to eliminate any loss in the desired color thereof. From the cooler 14 the purified oil is received within a tank 15 or its equivalent as a finished or purified product.

The bottom of the separator 10 is connected with a pipe line 16 in which is arranged a circulating pump 17 by which the clay and oil mixture is returned to the inlet side of the charging pump 3, where it is mixed with the fresh oils obtained from the tank 1. The amount of clay returned to the treating zone, in addition to the new clay, is controlled by the speed of the pump 3 in drawing the clay mixture from the bottom of the settling tank or from the clay feeding unit 4. Another pipe line 18 extends from the bottom of the separator 10 and passes through a filter press 19 to a storage tank 20, the line 18 serving to take care of excess oil and clay material present in the bottom of the separator in quantities too excessive for return through the zone 6. The flow of material through the lines 16 and 18 may be regulated by valves 21.

The present invention provides for the effective treatment particularly of lubricating oil stocks to remove from such stocks compounds of a deleterious character which interfere seriously with the utility of such stocks as lubricating oils. In this respect color and acid producing compounds particularly are removed, and this object is attained advantageously at low treating costs. Prior systems employing fresh fuller's earth for each operation while efficient have been extremely costly to operate. The present invention largely alleviates this condition by permitting of the reuse of the treating agent without any additional or supplemental treatment of the agent after separation from the purified oils. While fresh clay is being continuously added to the system from the unit 4, the quantity thereof, as compared with the demands of prior systems, is considerably reduced by the recirculation of the earth previously introduced into the system. It will be understood that the withdrawal of the spent clay, the recirculation of the clay and the addition of fresh clay are operations under the ready control of the operator and after some use of the system these operations may be correlated in the securing of economy and at the same time maintaining the desired standards of purification.

What is claimed is:

1. The continuous method of purifying and decolorizing oils with adsorbents which comprise: heating in a treating zone a confined flow stream composed of an oil to be decolorized and an adsorbent to a temperature above the vaporization point of the oil while applying pressure to the stream to prevent the evolution of oil vapor, continuously removing the oils from said heated treating zone to a separating zone whereby said oils are maintained at a vicosity permitting of the separation of the oils into a fraction substantially free from said adsorbent and a fraction containing said adsorbent, continuously removing the adsorbent-free oils from the system, continuously returning a portion of the adsorbent-containing fraction to the inlet side of said treating zone for recirculation through said latter zone, and continuously adding fresh adsorbent to the oils entering said treating zone.

2. The continuous method of purifying and decolorizing oils with adsorbents which comprises: heating a mixture consisting of an oil to be decolorized and an adsorbent to temperatures above the vaporization point of the oil, coincidentally applying pressures to prevent the evolution of oil vapors and maintaining said mixture in substantially the liquid phase, then passing the heated oils into a separating zone at temperatures sufficiently high to control the viscosities of the oil to admit of the separation of the adsorbent from the purified oils, separately and continuously removing the purified oils from the separating zone, separately and continuously removing the adsorbent-oil mixture from the separating zone, continuously returning a portion of said adsorbent-oil mixture to the aforesaid heating zone, and continuously introducing a fresh adsorbent into the inlet side of said treating zone.

3. The method of purifying and decolorizing oils with fuller's earth which comprises: continuously heating in a treating zone a mixture consisting of an oil to be decolorized and an adsorbent to a temperature above the vaporization point of the oil and coincidentally applying pressure to prevent the evolution of oil vapors, maintaining the viscosity of the purified oils discharged from the treating zone by collecting said oils in a treating zone, discharging the purified oils from the top of the separating zone, and separately discharging the fuller's earth from the bottom of the separating zone and returning such earth and accumulated heavy oils to a stream of untreated oil prior to the introduction of the latter into the treating zone.

4. The method of purifying and decolorizing oils with adsorbents which comprises continuously heating in a treating zone a confined flow stream composed of an oil to be decolorized and an adsorbent to a temperature in excess of 500° F. and above the vaporization point of the oil but below the cracking temperature thereof, coincidentally applying pressure to the stream to prevent substantially the evolution of oil vapor, maintaining the oil following release from said treating zone at a temperature sufficiently high to hold the oil at such viscosity as to permit of the separation of the adsorbent and polymerized bodies therefrom, discharging and collecting the purified oils, and separately returning a portion, at least, of the adsorbent and such polymerized bodies to untreated oils prior to their entry into the heated portion of the treating zone.

5. The method of purifying hydrocarbon lubricating oils, comprising passing a stream composed of a mixture of such oils, a finely divided solid adsorbent and hydrocarbon polymers through an elongated externally heated polymerizing zone of restricted cross sectional area, heating said mixture during the passage of the latter through said zone of temperatures above the vaporizing point of certain of the oil but below the cracking temperatures thereof, coincidentally applying pressure to the stream to prevent substantially the evolution of oil vapor, said mixture being retained in said zone for a sufficient period of time to substantially transform the undesired compounds in said oils into higher boiling polymerized compounds, maintaining the oil following release from said heating zone at a temperature sufficiently high to hold the oil at such viscosity as to permit of the separation of the adsorbent and polymerized bodies from the desired purified oils, discharging and collecting the purified oils, and separately returning a portion, at least, of the adsorbent and such polymerized bodies to untreated oils of the character specified prior to their entry into the heating zone.

6. The method of removing impurities from hydrocarbon lubricating oils, which comprises subjecting such oils while admixed with polymerized hydrocarbon compounds and a finely divided solid absorbent to temperatures which are normally sufficiently high to vaporize certain of said oils but without substantially cracking the same, maintaining the oils in the liquid phase by the employment of superatmospheric pressures while in said zone and retaining the oils in said zone for a sufficient period of time to transform the reactive undesired compounds present in said oils into high boiling petroleum polymers, subjecting said mixture following the heating thereof and while in the liquid phase to separation whereby to remove from the treated oils the polymerized bodies and the adsorbent, and returning a portion, at least, of the polymerized bodies and catalyst for admixture with the fresh untreated oils while the latter are undergoing heating.

7. The method of removing impurities from hydrocarbon lubricating oils, which comprises subjecting such oils while admixed with polymerized hydrocarbon compounds and a finely divided solid adsorbent to temperatures which are normally sufficiently high to vaporize certain of said oils but without substantially cracking the same, maintaining the oils in the liquid phase by the employment of superatmospheric pressures while in said zone and retaining the oils in said zone for a sufficient period of time to transform the reactive undesired compounds present in said oils into high boiling petroleum polymers, and subjecting said mixture following the heating thereof and while in the liquid phase to separation whereby to remove from the treated oils the polymerized bodies and the adsorbent.

In testimony whereof I affix my signature.

RUDOLPH C. OSTERSTROM.